United States Patent [19]

Tateoka et al.

[11] Patent Number: 4,674,825
[45] Date of Patent: Jun. 23, 1987

[54] SCANNING OPTICAL SYSTEM

[75] Inventors: Masamichi Tateoka; Toshinori Ando, both of Yokohama, Japan

[73] Assignee: Canon Kabushiki Kaisha, Tokyo, Japan

[21] Appl. No.: 666,462

[22] Filed: Oct. 30, 1984

[30] Foreign Application Priority Data

Nov. 5, 1983 [JP] Japan ................................ 58-207834

[51] Int. Cl.$^4$ .............................................. G02B 26/10
[52] U.S. Cl. ........................................ 350/6.8; 350/6.5
[58] Field of Search ................ 350/6.4, 6.5, 6.6, 6.8, 350/434, 474, 475

[56] References Cited

U.S. PATENT DOCUMENTS

| 4,390,235 | 6/1983 | Minoura | 350/6.6 |
| 4,401,362 | 8/1983 | Maeda | 350/6.8 |
| 4,447,112 | 5/1984 | Matsuoka et al. | 350/434 |

Primary Examiner—John K. Corbin
Assistant Examiner—Loha Ben
Attorney, Agent, or Firm—Fitzpatrick, Cella, Harper & Scinto

[57] ABSTRACT

The scanning optical system of this invention has a light source, a first focussing optical system linearly focussing a light beam coming from the light source, a deflector having its deflecting-reflection surface in the vicinity of the focussing image, and a second focussing optical system for focussing the light beam deflected by the deflector on a medium to be scanned. The second focussing optical system has a spherical single lens having negative refractive power, a spherical single lens having positive refractive power and a single lens having a toric surface. By this arrangement, a focussing spot having a small diameter in the main scanning direction and having a well compensated curvature of field and distortion can be formed on the medium to be scanned.

1 Claim, 7 Drawing Figures

SCANNING OPTICAL SYSTEM

BACKGROUND OF THE INVENTION

1. Field of the Invention

This invention relates to a scanning optical system for eliminating any irregularity of the pitch of the scanning lines and having a relatively bright F number (i.e. small) in the main scanning direction.

2. Description of the Prior Art

In conventional light beam scanning devices using a deflecting-reflection surface, such as, a rotating polygon mirror, there have been proposed various kinds of scanning optical systems in which the advancing direction of the light beam deflectingly scanned by the deflecting-reflection surface is deviated, due to a shift of the deflecting-reflection surface, relative to a surface perpendicular to the deflection surface, which is formed by rotating the line normal to the deflecting-reflection surface. Consequently, there occurs an irregularity of the pitch of the scanning lines.

For example, in Japanese patent publication No. 28666/1977, which corresponds to U.S. Pat. No. 3,750,189, the optical system between the deflecting device and the medium to be scanned consists of beam shaping means and second beam focussing means so as to collimate the light flux reflected by the deflection mirror by said beam shaping means. When such a collimating function is provided a restrictive condition is required for the shape of the beam shaping means to keep constant the focussing property on the surface to be scanned and the speed of focussing, the strain is produced and the freedom for improving the performance characteristics is decreased and it is difficult to obtain an excellent performance characteristics unless the number of lenses constituting the second beam focussing system is increased.

In the Japanese patent laid-open application No. 93720/1975, which corresponds to U.S. Pat. No. 3,946,150, a cylindrical lens is disposed between the lens having strain property of realizing equal speed scanning and the medium to be scanned. With this arrangement, it is not possible to obtain a good image unless the cylindrical lens is located near the medium to be scanned. When the cylindrical lens is located close to the medium to be scanned the scanning width becomes long so that it is difficult to realize a compact structure.

In the Japanese patent laid-open application No. 36622/1981, corresponding to U.S. Pat. No. 4,379,612, an optical system consisting of a spherical single lens and a single lens having a toric surface is disposed between the deflector and the medium to be scanned to give a strain property and the function to compensate for the shift of the deflecting-reflection surface. In this arrangement, although a compact structure is obtained, two single lenses are provided in the main scanning direction, the freedom is less and it is not possible to reduce the spreading of the stop in the main scanning direction.

In recent laser beam scanning optical systems, it has been required to provide gradation within 1 dot by dividing 1 dot into two or three parts only in the main scanning direction. For dividing 1 dot into two or three parts in the main scanning direction, the pulse width of the laser is changed. Thus, it is necessary, within a small pulse width of less than 1 dot, that the width of the beam spot in the main scanning direction is made equal to the length on the surface to be scanned corresponding to said pulse width.

SUMMARY OF THE INVENTION

An object of the invention is to provide a scanning optical system capable of compensating for the shift of the deflector by a simple structure, having a constant beam scanning speed on the surface to be scanned and a small focussing width in the main scanning direction.

The above mentioned object is achieved by the scanning optical system of this invention in which the focussing optical system for scanning to be disposed between the deflector and the medium to be scanned comprises a negative spherical single lens, a positive spherical single lens and a single lens having a toric surface arranged in this order as viewed from the deflector. The scanning optical system of this invention comprises a light source, a first focussing optical system for focussing the light beam from the light source into a line image, a deflector having its deflecting surface in the vicinity of the line image and a second focussing system for focussing the line image as a spot on the medium to be scanned, the second focussing optical system comprising a spherical concave single lens, a spherical convex single lens and a toric single lens arranged in this order as viewed from the deflector. With this arrangement of the focussing system, the shape of the beam spot on the surface to be scanned has an elliptic shape, longer in the subsidiary scanning direction perpendicular to the main scanning direction than in the main scanning direction.

In the scanning optical system of this invention, the toric lens is a negative meniscus lens having one surface with a negative refractive power disposed toward the deflector within a cross section including the optical axis of said two spherical single lenses and perpendicular to the deflection surface formed by the beam deflected by the deflector and another surface having a positive refractive power toward the medium to be scanned. Stated differently, the toric lens is a meniscus lens having a concave surface toward the deflector.

DESCRIPTION OF THE PREFERRED EMBODIMENTS

Figure 1:
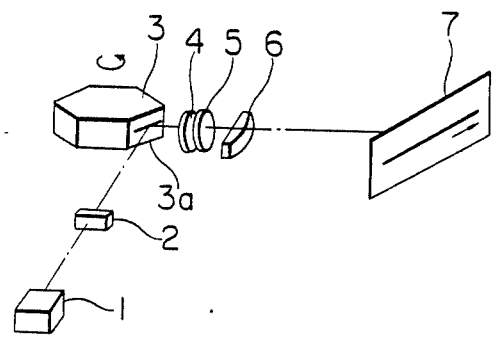
FIG. 1 is a perspective view of an embodiment of the scanning optical system according to the present invention.

FIG. 1 shows a structure, in principle, of an embodiment of the present invention. Light source means 1 consists of a light source or a light source and focussing means. In FIG. 1, numeral 2 designates a line image focussing system to linearly focus the light image coming from said light source means 1. Numeral 3 designates a deflector having its deflecting-reflection surface 3a in the vicinity of the position where the light beam converges in linear form by said linear image focussing system 2. Between the deflector 3 and the medium to be scanned 7, a spherical concave single lens 4, a spherical convex single lens 5 and a single lens 6 are provided. The single lens 6 has a toric surface having a principal axis and a subsidiary axis perpendicular to the principal axis having different refractive powers, respectively. With the composite system of these lenses, the focussing image spot is formed on the medium 7 so as to scan the surface of the medium 7 as the deflector 3 rotates.

Figure 2:
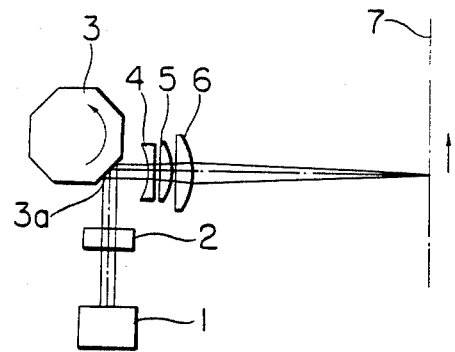
FIG. 2 shows the state of the light beam within the deflecting surface of the scanning optical system of the present invention.

FIG. 2 illustrates the function of the scanning optical system of the above-noted structure within the deflecting surface. The light beam emerging from the light source means 1 passes cylindrical lens 2 and is reflected by the reflecting surface 3a of the deflector 3 and the reflected light beam is deflected as the deflector rotates. The deflected light beam is focussed on the medium to be scanned 7 by the composite system consisting of lenses 4, 5 and 6, and the focussed beam spot is scanned at a constant speed.

Figure 3:
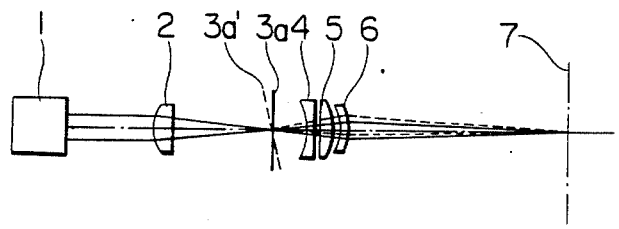
FIG. 3 shows the state of the light beam within a surface perpendicular to the deflecting surface of the scanning optical system of the present invention.

FIG. 3 is a developing figure of the cross section, which directs the light beam perpendicular to said deflecting surface, for compensating for any shift of the deflector. The light beam exiting from the light source device 1 is focussed in linear form in the vicinity of the reflecting surface 3a of the deflector 3. The refractive power of the single lens 6 within said cross section is different from the refractive power in the cross section of FIG. 2, and the positional relationship between said reflecting surface 3a and the medium 7 is made conjugate by the composite system comprising lenses 4, 5 and 6. Thus, even if the reflecting surface 3a shifts to the position of 3a' during the rotation of the deflector 3, the focussing position of the beam spot on the medium to be scanned 7 does not change.

In the scanning optical system of this invention, the aperture ratio in the main scanning direction is 1:10–1:50, which is relatively larger than that in a conventional scanning system. With such an aperture ratio, the aberrations subjected to correction are mainly curvature of field and distortion, however, since the aperture ratio is larger than the conventional scanning system, the allowable quantity of these aberrations, especially curvature of field, becomes small.

Therefore in the present invention, for properly compensating the curvature of field, especially in the main scanning direction, the shape of the negative first spherical single lens is that of a meniscus, concave surface of which is directed to the deflector and the shape of the positive second spherical single lens is made meniscus of which the concave surface is directed to the deflector. Since, the composite power of these first and second spherical single lenses is made negative, the curvature of field is well compensated.

In the following embodiments, since the surface of the toric lens 6 facing the deflector in the deflecting surface is a plane surface it facilitates the manufacture of the toric lens.

Figure 5:
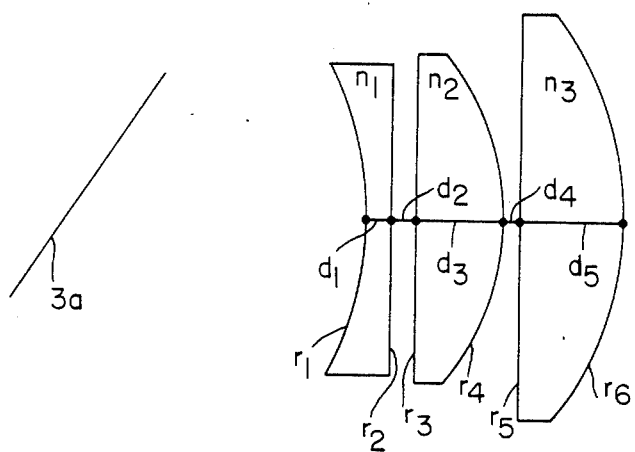
FIGS. 5 and 6 respectively show an optical system where the radius of curvature of the lens within the plane surface is parallel with a deflection surface and where the radius of curvature of the lens within the plane surface is perpendicular to a deflection surface.
Figure 6:
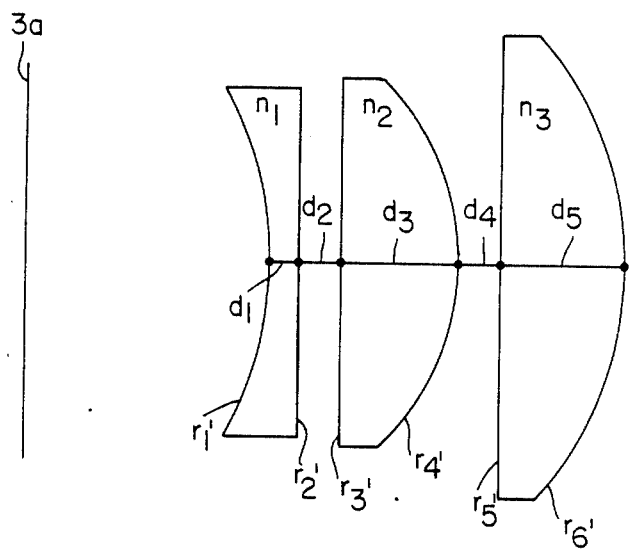

The following are the embodiments of scanning optical system of the present invention comprising negative spherical single lens 4, positive spherical single lens 5 and the single lens 6 having a toric surface, wherein $r_1$ to $r_6$ denote radii of curvature of the lenses within the plane surface parallel with the deflection surface, $r_1'$ to $r_6'$ denote radii of curvature of the lenses in the cross section perpendicular to the deflection surface, $d_1$, $d_3$ and $d_5$ are thicknesses on the axis of the lenses, $d_2$ and $d_4$ are air spaces between the lenses on their axis and $n_1$, $n_2$ and $n_3$ are the refractive indices of the lenses. FIG. 5 shows an optical system where the radii of curvature of the lens within the plane surface are parallel with the deflection surface while FIG. 6 shows an optical system where the radii of curvature are perpendicular to the deflection surface.

First Embodiment:

| | | | |
|---|---|---|---|
| $r_1 = -28.975$ | $r_1' = 28.975$ | $d_1 = 3.42$ | $n_1 = 1.51072$ |
| $r_2 = 236.72$ | $r_2' = 236.72$ | $d_2 = 2.25$ | |
| $r_3 = -122.35$ | $r_3' = -122.35$ | $d_3 = 15.67$ | $n_2 = 1.51072$ |
| $r_4 = -42.889$ | $r_4' = -42.889$ | $d_4 = 0.57$ | |
| $r_5 = \infty$ | $r_5' = -166.67$ | $d_5 = 16.76$ | $n_3 = 1.76591$ |
| $r_6 = -96.776$ | $r_6' = -33.956$ | | |

Second Embodiment:

| | | | |
|---|---|---|---|
| $r_1 = -40.16$ | $r_1' = -40.16$ | $d_1 = 5.01$ | $n_1 = 1.51072$ |
| $r_2 = -236.87$ | $r_2' = -236.87$ | $d_2 = 8.05$ | |
| $r_3 = -137$ | $r_3' = -137$ | $d_3 = 16.32$ | $n_2 = 1.51072$ |
| $r_4 = -59$ | $r_4' = -59$ | $d_4 = 1.02$ | |
| $r_5 = \infty$ | $r_5' = -251.689$ | $d_5 = 14.35$ | $n_3 = 1.76591$ |
| $r_6 = -143.64$ | $r_6' = -47.928$ | | |

Third Embodiment:

| | | | |
|---|---|---|---|
| $r_1 = -51.823$ | $r_1' = -51.823$ | $d_1 = 6.53$ | $n_1 = 1.51072$ |
| $r_2 = -860.53$ | $r_2' = -860.53$ | $d_2 = 3.23$ | |
| $r_3 = -181.29$ | $r_3' = -181.29$ | $d_3 = 15.31$ | $n_2 = 1.51072$ |
| $r_4 = -77.297$ | $r_4' = -77.297$ | $d_4 = 1.2$ | |
| $r_5 = \infty$ | $r_5' = -275.99$ | $d_5 = 19.71$ | $n_3 = 1.76591$ |
| $r_6 = -121.94$ | $r_6' = -43.932$ | | |

Figure 4A:
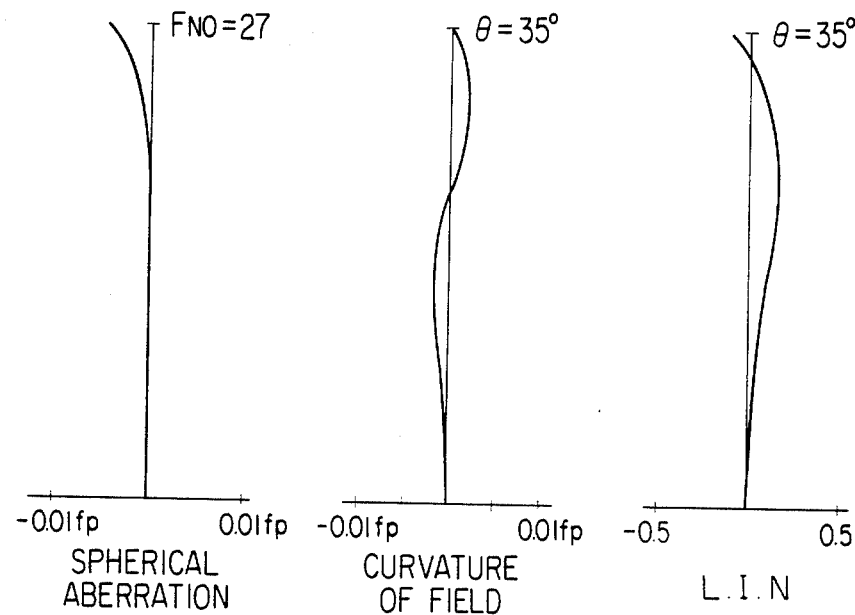
FIGS. 4A and 4B show various aberrations of an embodiment of the focussing lens system (4, 5 and 6) of the present invention.
Figure 4B:
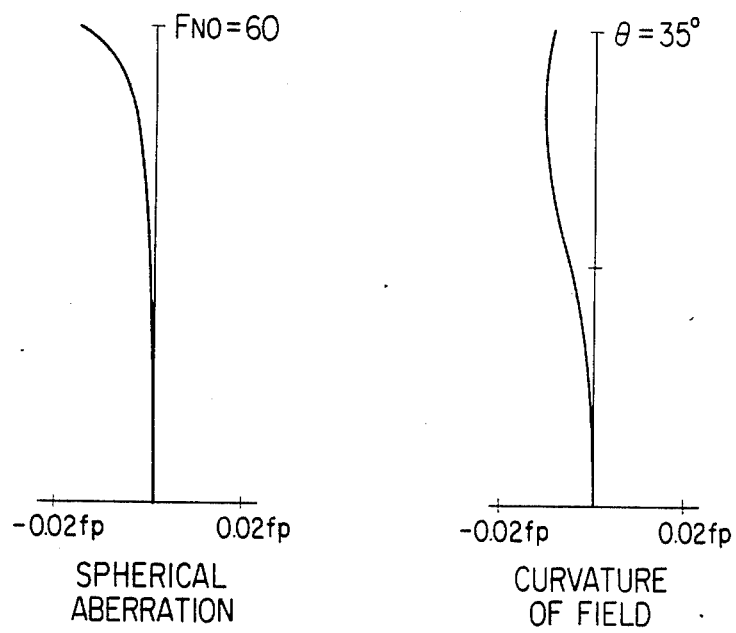

FIG. 4A shows aberrations in the plane surface parallel with the deflection surface, and FIG. 4B shows aberrations in the cross section perpendicular to the deflection surface, where $f_p$ is the focal length in the plane parallel with the deflection surface and LIN shows the quantity of the linearity.

$$\text{linearity} = \frac{y' - f_p \times \theta}{f_p \times \theta} \times 100$$

where $y'$ is image height and $\theta$ is angle of deflection.

As explained above, in the present invention, the focussing optical system between the deflector and the surface to be scanned comprises positive and negative spherical lenses and an anamorphic lens having a toric surface so that a focussing spot having a small diameter in the main scanning direction and having a properly compensated curvature of field and distortion can be formed on the medium to be scanned.

What we claim is:

1. A scanning optical system for scanning a medium with a light beam from a light source, said system comprising:
 a first focusing optical system for linearly focussing the light beam from said light source to form a linearly formed image;
 a deflecting means having a deflecting-reflection surface provided in the vicinity of said linearly formed image; and
 a second focussing optical system for focussing the light beam deflected by said deflecting means, said second focussing optical system comprising a spherical single lens having a negative refractive power, a spherical single lens having a positive refractive power, said two spherical lenses both having meniscus shape with its concave surface directed toward said deflecting means, and a single focus lens having a toric surface, said toric lens having a negative power in a plane including an optical axis and perpendicular to said deflecting-reflection surface and having a meniscus shape with its concave surface directed toward said deflecting means, said lenses being arranged in the stated order relative to the deflecting means.

* * * * *

UNITED STATES PATENT AND TRADEMARK OFFICE
CERTIFICATE OF CORRECTION

PATENT NO. : 4,674,825

DATED : June 23, 1987

INVENTOR(S) : MASAMICHI TATEOKA, ET AL.

It is certified that error appears in the above-identified patent and that said Letters Patent is hereby corrected as shown below:

AT [57] OF THE ABSTRACT

Line 13, "well" should read --properly--.

COLUMN 1

Line 12, "as, a" should read --as a--.
    Line 17, "surface, relative" should read
        --surface relative--.
    Line 29, "provided a" should read --provided, a--.
    Line 35, delete "an".

COLUMN 2

Line 10, "above mentioned" should read
        --above-mentioned--.
    Line 21, "focussing system" should read
        --focussing optical system--.
    Line 51, delete "and".
    Line 54, "invention" should read --invention; and--.

COLUMN 3

Line 21, "focussed beam" should read
        --focussed image beam--.
    Line 44, "than the" should read --than in the--.

UNITED STATES PATENT AND TRADEMARK OFFICE
CERTIFICATE OF CORRECTION

PATENT NO. : 4,674,825

DATED : June 23, 1987

INVENTOR(S) : MASAMICHI TATEOKA, ET AL.

It is certified that error appears in the above-identified patent and that said Letters Patent is hereby corrected as shown below:

COLUMN 3

Line 50, "meniscus, concave" should read
          --meniscus, the concave--.
    Line 54, "Since, the" should read --Since the--.
    Line 56, "well" should read --properly--.

COLUMN 4

Line 2, "$n_1$" should read --$n_1'$--.
    Lines 30-34, "$r_1=$ (second occurrence) should read --$r_1'=$
              $r_2=$                                 $r_2'=$
                $r_3=$                                 $r_3'=$
                $r_4=$                                 $r_4'=$
                $r_5=$                                 $r_5'=$
                $r_6=$                                 $r_6'=$ --.

Line 47, "θ" should read --θ-- (Greek theta).
    Line 60, "focusing" should read --focussing--.

Signed and Sealed this

Second Day of February, 1988

Attest:

DONALD J. QUIGG

Attesting Officer            Commissioner of Patents and Trademarks